(12) United States Patent
Ford (10) Patent No.: US 8,479,786 B2
(45) Date of Patent: Jul. 9, 2013

(54) DUMP CHUTE ADAPTOR AND METHOD (76) Inventor: Dennis Ford, Ruston, LA (US)

( * ) Notice: Subject to any disclaimer, the term of this patent is extended or adjusted under 35 U.S.C. 154(b) by 554 days.

(21) Appl. No.: 12/800,070

(22) Filed: May 7, 2010

(65) Prior Publication Data
US 2011/0272058 A1 Nov. 10, 2011

(51) Int. Cl.
B65B 1/04 (2006.01)
(52) U.S. Cl.
USPC ............... 141/386; 141/2; 141/18; 141/67; 220/284

(58) Field of Classification Search
USPC ............... 220/284; 141/2, 67, 18, 386, 387, 141/383
See application file for complete search history.

(56) References Cited

U.S. PATENT DOCUMENTS

| 4,858,695 A * | 8/1989 | Goble | 169/62 |
| 2009/0315322 A1 * | 12/2009 | Topacio | 285/33 |
| 2010/0244435 A1 * | 9/2010 | Stroope | 285/34 |

* cited by examiner

Primary Examiner — Jason K Niesz
(74) Attorney, Agent, or Firm — R. Keith Harrison (57) ABSTRACT A dump chute adaptor includes an adaptor housing having a housing interior and a conduit coupling carried by the adaptor housing and disposed in fluid communication with the housing interior.

18 Claims, 6 Drawing Sheets

DUMP CHUTE ADAPTOR AND METHOD

FIELD

The disclosure generally relates to fire trucks. More particularly, the disclosure relates to a dump chute adaptor which facilitates rapid filling of a water tank in a fire truck with water through a dump chute and a method of filling a water tank in a fire truck through a dump chute.

BACKGROUND

Conventional fire trucks may include an interior water tank which contains a supply of water that is used to extinguish a fire during a firefighting operation. A discharge coupling which is provided on the exterior of the truck may communicate with the water tank through a pump. A dump chute outlet which is typically provided on the rear of the truck may separately communicate with the water tank. Prior to the firefighting operation, water may be pumped from an available source of water into the tank through the intake coupling or through a separate inlet coupling on the truck. During the firefighting operation, water may be pumped from the water tank through the discharge coupling and through a fire hose coupled to the discharge coupling to extinguish the fire. During the firefighting operation, water which is in the water tank may be dumped by gravity feed from the water tank through a dump chute which is coupled to the dump chute outlet into a portable tank for additional water supply for firefighting operations.

A conventional method of filling the water tank of the fire truck with water includes coupling one end of a hose to the intake coupling on the truck and placing the other end of the hose in fluid communication with a fire hydrant, or the discharge coupling of a fire truck that is drafting from a pond or other available water source. Water is drafted from the water source and through the hose and then discharged to the inlet coupling, respectively, into the water tank either under positive pressure of the water (in the event that the water source is a fire hydrant) or under operation of the pump. However, due to the relatively small opening size of the intake coupling on the fire truck, valuable time may be expended in filling the water tank with water since the volume of water which can flow through the coupling into the water tank per unit time is restricted.

Therefore, a dump chute adaptor which facilitates rapid filling of a water tank in a fire truck with water through a dump chute and a method of filling a water tank in a fire truck through a dump chute are needed.

SUMMARY

The disclosure is generally directed to a dump chute adaptor which facilitates rapid filling of a water tank in a fire truck with water through a dump chute. An illustrative embodiment of the dump chute adaptor includes an adaptor housing having a housing interior and a conduit coupling carried by the adaptor housing and disposed in fluid communication with the housing interior.

In some embodiments, the dump chute adaptor may include an adaptor housing having a housing interior, a first housing edge and a second housing edge; a housing flange provided in the housing interior at the first housing edge; a chute seal gasket carried by the housing flange; a coupling plate having a coupling opening carried by the adaptor housing at the first housing edge; and a conduit coupling carried by the coupling plate and including a center coupling conduit disposed in fluid communication with the coupling opening, an inner coupling collar and an outer coupling collar disposed in concentric relationship with respect to the center coupling conduit and a pair of lock flanges and a pair of lock grooves provided in the outer coupling collar.

The disclosure is further generally directed to a method of filling a water tank in a fire truck. An illustrative embodiment of the method includes providing a fire truck having a water tank and a dump chute outlet communicating with the water tank; providing a dump chute adaptor having an adaptor housing and a conduit coupling carried by the adaptor housing; providing a dump chute; coupling the dump chute to the dump chute outlet on the fire truck; providing a water conduit; coupling the water conduit to the conduit coupling of the dump chute adaptor; providing the water conduit in fluid communication with a water source; and flowing water from the water source through the water conduit, the dump chute adaptor and the dump chute into the water tank of the fire truck, respectively.

BRIEF DESCRIPTION OF THE DRAWINGS

The disclosure will now be made, by way of example, with reference to the accompanying drawings, in which.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 7:
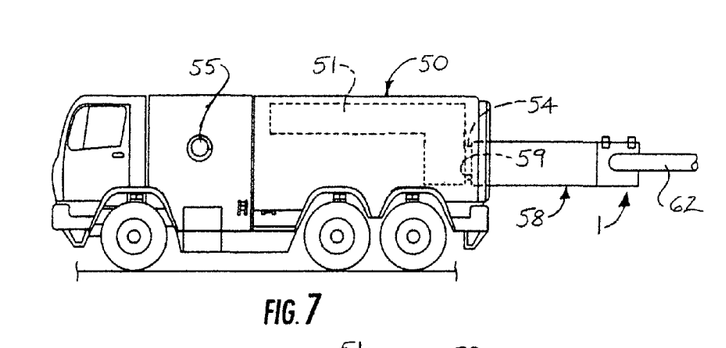
FIG. 7 is a side view of a fire truck, with a dump chute coupled to the fire truck and an illustrative embodiment of the dump chute adaptor coupled to the dump chute in exemplary application of the dump chute adaptor.
Figure 8:
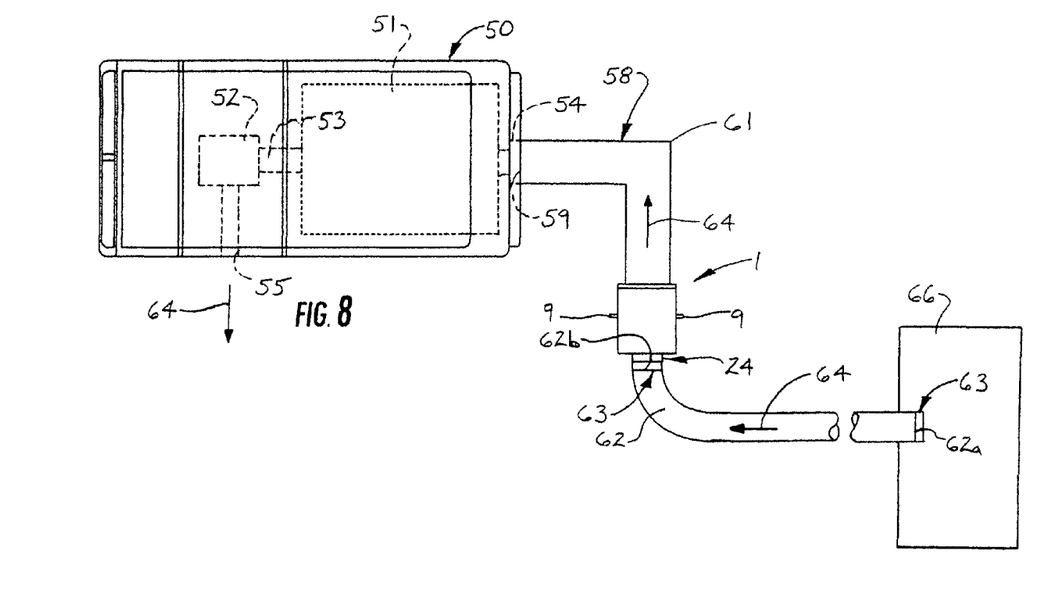
FIG. 8 is a top view of a fire truck, with a dump chute coupled to the fire truck and an illustrative embodiment of the dump chute adaptor coupled to the dump chute in exemplary application of the dump chute adaptor.

Referring initially to FIGS. 7 and 8 of the drawings, an illustrative embodiment of the dump chute adaptor is generally indicated by reference numeral 1. As will be hereinafter described, the dump chute adaptor 1 is suitably adapted to be placed in fluid communication with a dump chute 58 which may be standard or conventional and is disposed in fluid communication with a standard or conventional dump chute outlet 54 provided on a fire truck 50. Through the dump chute outlet 54, the dump chute 58 is disposed in fluid communication with a water tank 51 provided in the dump truck 50. A discharge coupling 55 may be provided on the exterior of the fire truck 50 and disposed in fluid communication with the water tank 51 through a pump 52 and a connecting conduit 53 (FIG. 8). The water tank 51 is adapted to contain a supply of water (not illustrated) which during a firefighting operation is pumped from the fire truck 50 through a fire hose (not illustrated) that is coupled to the discharge coupling 55 to extinguish a fire typically in a manner which will be hereinafter described. A water conduit 62 may be provided in fluid communication with the dump chute adaptor 1 to facilitate expeditious flow of a high volume of water 64 from an available water source 66 into the water tank 51 of the fire truck 50 through the dump chute adaptor 1, the dump chute 58 and the dump chute outlet 54, respectively. This technique may enable more rapid filling of the water tank 51 with water 64 than can typically be achieved using conventional water tank filling techniques and methods. In some applications, the water conduit 62 may be a standard or conventional large diameter hose (LDH) which is commonly used to convey water in firefighting operations.

Figure 1:
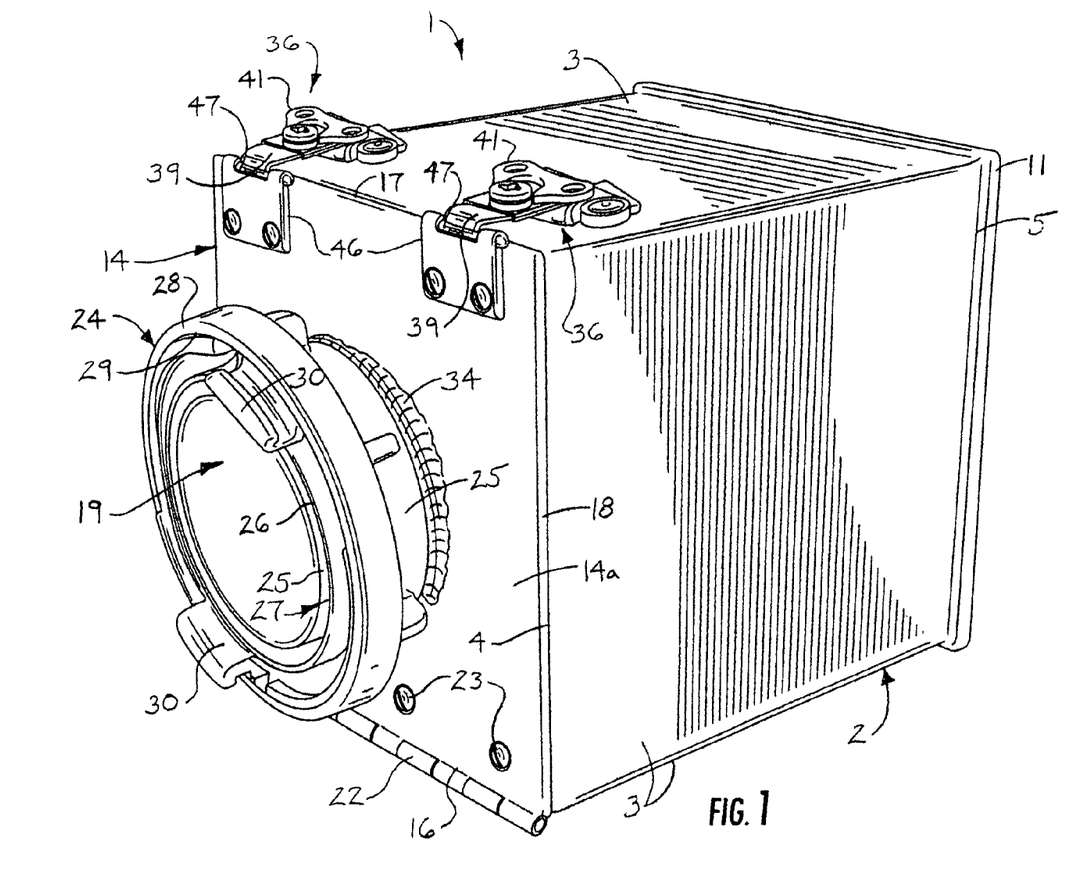
FIG. 1 is a front perspective view of an illustrative embodiment of the dump chute adaptor.
Figure 2:
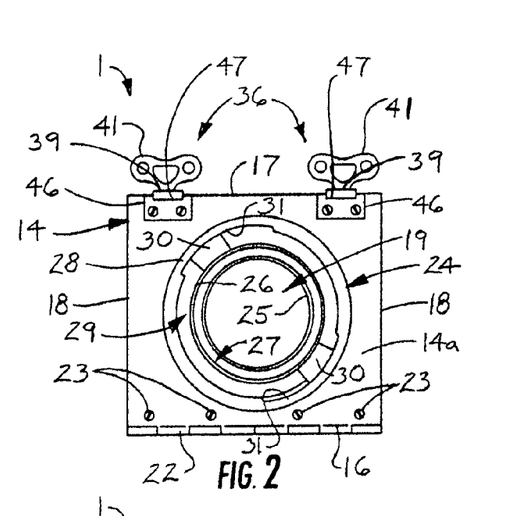
FIG. 2 is a front view of an illustrative embodiment of the dump chute adaptor.
Figure 3:
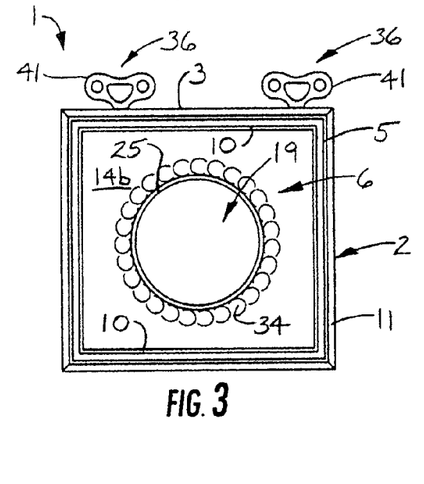
FIG. 3 is a rear view of an illustrative embodiment of the dump chute adaptor.

Referring next to FIGS. 1-6A of the drawings, the dump chute adaptor 1 includes an adaptor housing 2 having at least one adaptor housing wall 3 which imparts to the adaptor housing 2 a cross-sectional configuration that may generally correspond to the cross-sectional configuration of the dump chute 58 (FIGS. 7 and 8). In some applications, the dump chute 58 may have a generally rectangular or square cross-section; therefore, the adaptor housing 2 may have multiple adaptor housing walls 3 which impart a generally rectangular or square cross-sectional shape to the adaptor housing 2, as illustrated in FIGS. 2 and 3, and define a housing interior 6 (FIG. 3) which is shaped to receive and accommodate the correspondingly-shaped rectangular or square cross-sectioned dump chute 58. However, it will be recognized and understood that alternative cross-sectional shapes for the dump chute 58 and the adaptor housing 2 may be contemplated. Accordingly, in application of the dump chute adaptor 1, which will be hereinafter described, the housing interior 6 of the adaptor housing 2 may be suitably configured to telescopically receive the dump chute 58, as illustrated in FIG. 8 and will be hereinafter further described. Moreover, the adaptor housing 2 may be sized to accommodate a dump chute 58 of a particular size. The adaptor housing 2 may be steel, aluminum and/or other suitable metals or materials which are consistent with the functional requirements of the dump chute adaptor 1. In some embodiments, the housing walls 3 of the adaptor housing 2 may be powder coated for protection purposes.

Figure 4:
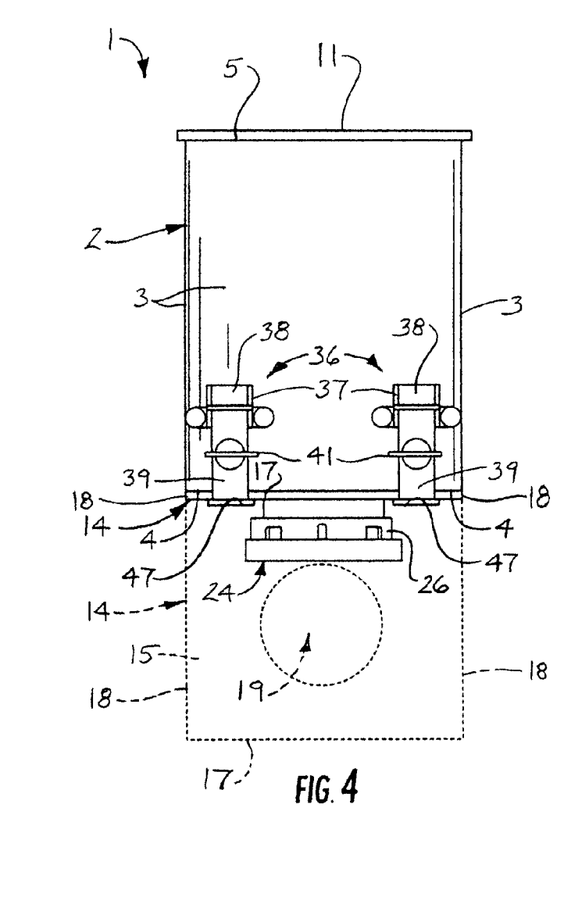
FIG. 4 is a top view of an illustrative embodiment of the dump chute adaptor, with an open position of an adaptor door of the adaptor shown in an open position in phantom.
Figures 5, 6A:
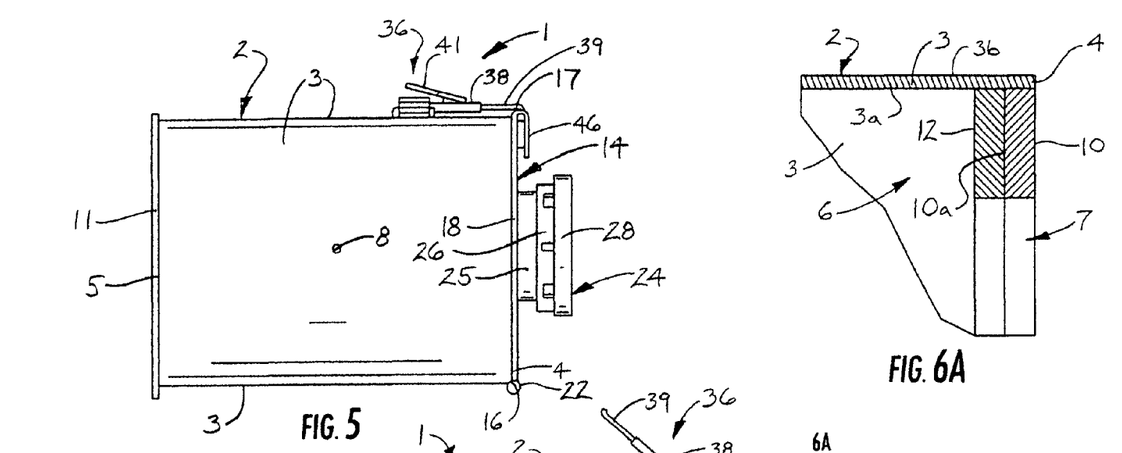
FIG. 5 is a side view of an illustrative embodiment of the dump chute adaptor.
FIG. 6A is an enlarged sectional view, taken along section line 6A in FIG. 6.

As illustrated in FIG. 4, the adaptor housing 2 may have a front housing edge 4 and a rear housing edge 5. As illustrated in FIG. 6A, in some embodiments a front housing flange 10 may protrude from the interior wall surfaces 3a of the adaptor housing walls 3 into the housing interior 6 at the front housing edge 4 of the adaptor housing 2 for housing reinforcement purposes. The front housing flange 10 may be welded to, cast in one piece with or otherwise attached to the housing walls 3 of the adaptor housing 2. An elastomeric chute seal gasket 12 may be provided on the interior surface 10a of the front housing flange 10 for purposes which will be hereinafter described. A front housing opening 7 which communicates with the housing interior 6 may be defined by the front housing flange 10 and the chute seal gasket 12. A rear housing flange 11 may protrude outwardly from the exterior surfaces 3b (FIG. 6A) of the adaptor housing walls 3 at the rear housing edge 5 of the adaptor housing 2.

A coupling plate 14 may be provided at the front housing edge 4 of the adaptor housing 2 to selectively close the front housing opening 7 of the adaptor housing 2. The coupling plate 14 may be aluminum or other material. In some embodiments, the coupling plate 14 may be pivotally attached to the adaptor housing 2 via at least one plate hinge 22. Each plate hinge 22 may be attached to the coupling plate 14 via at least one hinge fastener 23. The coupling plate 14 may have an exterior plate surface 14a (FIG. 2) and an interior plate surface 14b (FIG. 3) and a size and shape which generally correspond to the cross-sectional size and shape of the adaptor housing 2. Accordingly, in some embodiments the coupling plate 14 may have a generally rectangular or square shape, as illustrated, with a hinge edge 16 attached to the adaptor housing 2 via the plate hinge or hinges 22; a free edge 17 which is parallel and opposite to the hinge edge 16; and parallel side edges 18 which extend between the hinge edge 16 and the free edge 17. Accordingly, the coupling plate 14 may be selectively deployed in the closed position illustrated in FIGS. 1-5 such that the coupling plate 14 engages the front housing edge 4 of the adaptor housing 2 or the open position illustrated in FIG. 6 and in phantom in FIG. 4 such that the coupling plate 14 can be pivoted away from the front housing edge 4 of the adaptor housing 2 on the plate hinge or hinges 22. In some embodiments, the coupling plate 14 may be adapted to pivot at least 180 degrees away from the plane of the front housing edge 4 of the adaptor housing 2 for purposes which will be hereinafter described.

At least one coupling plate latch 36 may be provided on the exterior wall surface 3b (FIG. 6A) of the adaptor housing 2 and adapted to detachably engage and secure the coupling plate 14 in the closed position on the adaptor housing 2. In some embodiments, a pair of spaced-apart coupling plate latches 36 may be provided on the adaptor housing 2 to detachably engage the coupling plate 14, as illustrated. Each coupling plate latch 36 may have any design which is suitable for the purpose. In some embodiments, each coupling plate latch 36 may be a link lock rotary action-type latch which may have a conventional design. Such a link lock rotary action latch may be obtained from the Reid Supply Co. of Muskegon, Mich. Accordingly, as particularly illustrated in FIG. 4, each coupling plate latch 36 may include a dual-flanged latch base 37 which is provided on the adaptor housing 2. A generally elongated latch sheath 38 may be pivotally mounted between the flanges of the latch base 37. A latch hasp 39 may be slidably extendable from the latch sheath 38. A spring-loaded latch handle 41 may engage the latch sheath 38 and the latch hasp 39. Upon rotation of the latch handle 41, the latch hasp 39 slides between locking and unlocking positions on the latch sheath 38. At least one latch hasp receptacle 46 having a hasp slot 47 may be provided on the coupling plate 14. Accordingly, by rotation of the latch handle 41 in a first clockwise or counterclockwise direction, the latch hasp 39 of the coupling plate latch 36 engages the hasp slot 47 of the latch hasp receptacle 46 to secure the coupling plate 14 in the closed position on the adaptor housing 2. Conversely, by rotation of the latch handle 41 in a second counterclockwise or clockwise direction, the latch hasp 39 of the coupling plate latch 36 disengages the hasp slot 47 of the latch hasp receptacle 46 to facilitate opening of the coupling plate 14 on the adaptor housing 2.

As illustrated in FIGS. 2-4, a coupling opening 19 may be provided in the coupling plate 14. A conduit coupling 24 may be provided on an exterior plate surface 14a (FIG. 2) of the coupling plate 14 in fluid communication with the coupling opening 19. In some embodiments, the conduit coupling 24 may be a standard or conventional Storz hose coupling which is commonly used to couple a fire hoses to fire hydrants or fire trucks. The conduit coupling 24 may include a center coupling conduit 25 which is connected to the coupling plate 14 through a weld 34 and/or other attachment technique and communicates with the coupling opening 19 in the coupling plate 14. An inner coupling collar 26 and an outer coupling collar 28 may be provided in concentric relationship with respect to the center coupling conduit 25. An inner coupling groove 27 may be defined between the center coupling conduit 25 and the inner coupling collar 26. An outer coupling groove 29 may be defined between the inner coupling collar 26 and the outer coupling collar 28. A pair of spaced-apart lock flanges 30 and a pair of spaced-apart lock grooves 31 may be provided on the outer coupling collar 28.

As illustrated in FIG. 8, in exemplary application of the dump chute adaptor 1, which will be hereinafter further described, a conduit coupling 63 may be provided on the water conduit 62 to facilitate attachment of the water conduit 62 to the dump chute adaptor 1. The conduit coupling 63 may be a Storz hose coupling having the same features which were heretofore described with respect to the conduit coupling 24. Accordingly, the conduit coupling 63 provided on the water conduit 62 can be readily coupled to the conduit coupling 24 provided on the coupling plate 14 of the dump chute adaptor 1 to couple the water conduit 62 to the dump chute adaptor 1.

Referring next to FIGS. 7-9A of the drawings, in an exemplary application the dump chute adaptor 1 connects a water conduit 62 to a dump chute 58 which is connected to a dump chute outlet 54 provided on the fire truck 50. This arrangement enables a high volume of water 64 to be rapidly pumped from an available water source 66 into the water tank 51 provided in the fire truck 50 during and after a firefighting operation. The water source 66 may be a fire hydrant another fire truck drafting from a lake, pond, river, swimming pool, or any other body of water from which water can be extracted to extinguish a fire during a firefighting operation. By operation of the pump 52 during the ensuing firefighting operation, the water 64 is pumped from the water tank 51 through the connecting conduit 53 and discharge coupling 55, respectively, and discharged onto a fire from a fire hose (not illustrated) which is connected to the discharge coupling 55 in an effort to extinguish the fire.

Figure 9:
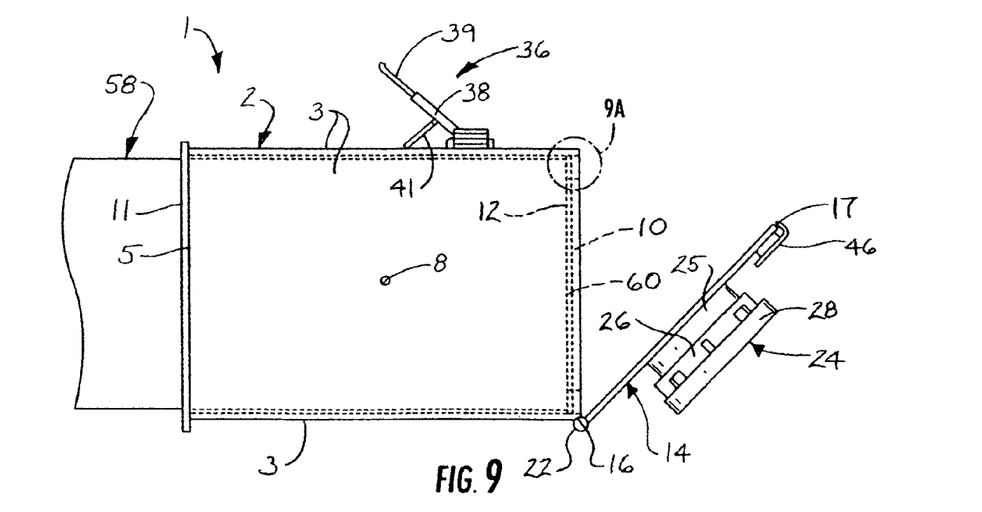
FIG. 9 is a side view of an illustrative embodiment of the dump chute adaptor, provided on a dump chute (partially in section) and with the adaptor door partially open.
Figure 9A:
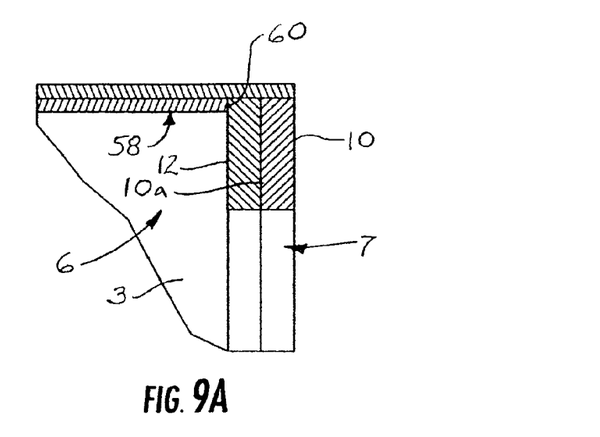
FIG. 9A is an enlarged sectional view, taken along line 9A in FIG. 9.

The dump chute 58 has a first dump chute end 59 which may be coupled to a standard or conventional dump chute outlet 54 provided typically on the rear end of the fire truck 50 and a second dump chute end 60 (FIGS. 9 and 9A) which is opposite the first dump chute end 59. As illustrated in FIG. 8, the dump chute 58 may have a dump chute bend 61 between the first dump chute end 59 and the second dump chute end 60. As illustrated in FIGS. 9 and 9A, the adaptor housing 2 is placed on the second dump chute end 60 of the dump chute 58 by inserting the second dump chute end 60 into the housing interior 6 of the adaptor housing 2 and sliding the adaptor housing 2 on the dump chute 58 until the second dump chute end 60 engages the chute seal gasket 12 provided against the interior surface 10a of the front housing flange 10 of the adaptor housing 2. Therefore, the chute seal gasket 12 imparts a fluid-tight seal between the front housing opening 7 and the interior of the dump chute 58.

Figure 6:
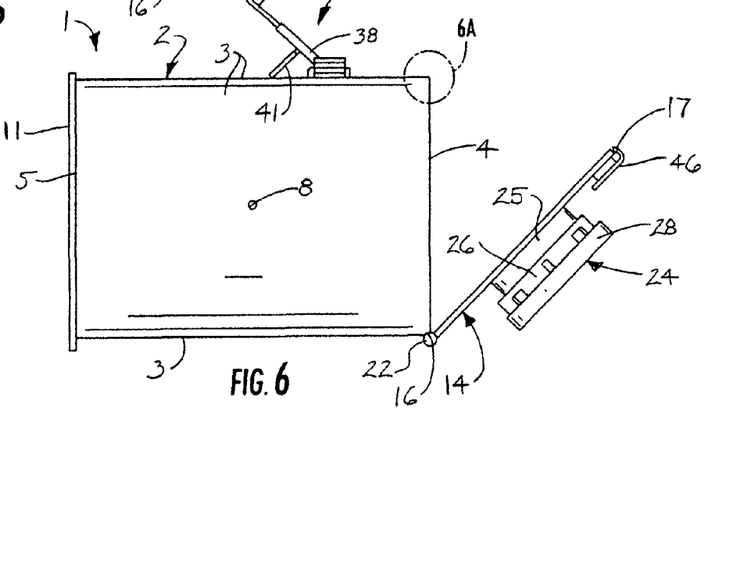
FIG. 6 is a side view of an illustrative embodiment of the dump chute adaptor, with the adaptor door illustrated in an open position.

The adaptor housing 2 of the dump chute adaptor 1 may be secured to the dump chute 58 using any technique which is known by those skilled in the art and suitable for the purpose. As illustrated in FIGS. 5, 6 and 9, in some embodiments pin openings 8 may be provided in opposite adaptor housing walls 3 of the adaptor housing 2. As illustrated in FIG. 8, housing coupling pins 9 may be inserted through the pin openings 8 and through respective registering pin openings (not illustrated) provided in the dump chute 58. Seals (not illustrated) may be provided in each set of pin openings to provide a fluid-tight seal of the pins in the respective sets of pin openings. In some embodiments, the adaptor housing 2 of the dump chute adaptor 1 may be fixedly attached to the dump chute 58 using welding, fasteners and/or other suitable attachment technique known by those skilled in the art. The dump chute adaptor 1 may be secured to the dump chute 58 either before or after the fire truck 50 arrives at the site of the available water source 66. After arrival of the fire truck 50 at the water source 66, the water conduit 62 is coupled to the dump chute adaptor 1. As the water conduit 62 is coupled to the dump chute adaptor 1, the coupling plate 14 is disposed in the closed position illustrated in FIGS. 1-5 with the coupling plate latches 36 engaging the respective latch hasp receptacles 46 provided on the coupling plate 14.

The water conduit 62 may be may be a standard or conventional large diameter hose (LDH) which is commonly used to convey water in firefighting operations. The water conduit 62 has an inlet end 62a and an outlet end 62b which is opposite the inlet end 62a, with a conduit coupling 63 typically provided on each of the inlet end 62a and the outlet end 62b of the water conduit 62. The conduit coupling 63 provided on the outlet end 62b of the water conduit 62 is coupled to the conduit coupling 24 which is provided on the coupling plate 14 of the dump chute adaptor 1 typically in the conventional manner. In applications in which the water source 66 is a fire hydrant, the conduit coupling 63 on the inlet end 62a of the water conduit 62 may be coupled to a similar coupling (not illustrated) on the fire hydrant. In applications in which the water source 66 is another fire truck 50, the conduit coupling 63 on the inlet end 62a of the water conduit 62 may be coupled to a discharge coupling 55 (FIG. 7) on the exterior of the fire truck 50. In applications in which the water source 66 is a lake, river, pond or the like, the fire truck 50 may draft water from the water source 66 through the dump chute adaptor 1 and the dump chute 58 and into the water tank 51, respectively.

Next, the pump 52 on the fire truck 50 may be operated to draw water 64 from the water source 66 through the water conduit 62, the dump chute adaptor 1 and the dump chute 58 and into the water tank 51, respectively. In applications in which the water source 66 is a fire hydrant or another fire truck 50 or the like, the water 64 may flow through the water conduit 62, the dump chute adaptor 1 and the dump chute 58 and into the water tank 51 under positive pressure without the need to operate the pump 52. It will be appreciated by those skilled in the art that the large cross-sectional surface area of the dump chute adaptor 1, the dump chute 58 and the dump chute outlet 54 facilitates rapid flow of a high volume of water 64 into the water tank 51 of the fire truck 50, resulting in quick and expeditious filling of the water tank 51. Moreover, the flowing water 64 encounters little or no friction from valves, small openings and other structures or from the interior surfaces of the adaptor housing 2 and the dump chute 58 as the water 64 flows into the water tank 51.

After the water tank 51 has been filled with the desired quantity of water 64, the water conduit 62 is uncoupled from the dump chute adaptor 1 and the fire truck 50 is driven to the site of the firefighting operation. At the site of the firefighting operation, a fire hose (not illustrated) may then be coupled to the discharge coupling 55 and the pump 52 operated to draw water 64 from the water tank 51 through the connecting conduit 53 and discharge the water 64 onto the fire from the nozzle of the fire hose.

During the firefighting operation, water which is in the water tank 51 of the fire truck 50 may be quickly expelled from the water tank 51 through the dump chute 58 and the dump chute adaptor 1 into a portable tank (not illustrated) which may be used for firefighting operations. Accordingly, the coupling plate 14 of the dump chute adaptor 1 may be opened as illustrated in FIGS. 6 and 9 by disengaging the coupling plate latches 36 from the respective latch hasp receptacles 46 provided on the coupling plate 14 and pivoting the coupling plate 14 open with respect to the plate hinge or hinges 22. The dump chute outlet 54 may then be opened to facilitate gravity flow of water 64 from the water tank 51 and through the dump chute 58. The water 64 is then discharged from the dump chute 58 through the open front housing opening 7 (FIG. 6A) of the adaptor housing 2.

It will be appreciated by those skilled in the art that the dump chute adaptor 1 expedites filling of the water tank 51 of the fire truck 50 with water by a factor of up to three or four to one. Due to the large volume of the adaptor housing 2 of the dump chute adaptor 1 relative to the volume of the conventional water intake of the fire truck 50, a much greater volume of water can flow into the water tank 51 through the dump chute adaptor 1 and the dump chute 58 as compared to the water intake.

It will further be appreciated by those skilled in the art that under circumstances in which the dump chute 58 is excessively short to attach the dump chute adaptor 1 thereto, the coupling plate 14, the plate hinge 22 and the coupling plate latches 36 may be removed from the adaptor housing 2 and permanently attached to the existing dump chute discharge 54 on the fire truck 50. Accordingly, the water conduit 62 may be attached to the conduit coupling 24 on the coupling plate 14 to fill the water tank 51 in the fire truck 50 through the water conduit 62.

Figure 10:
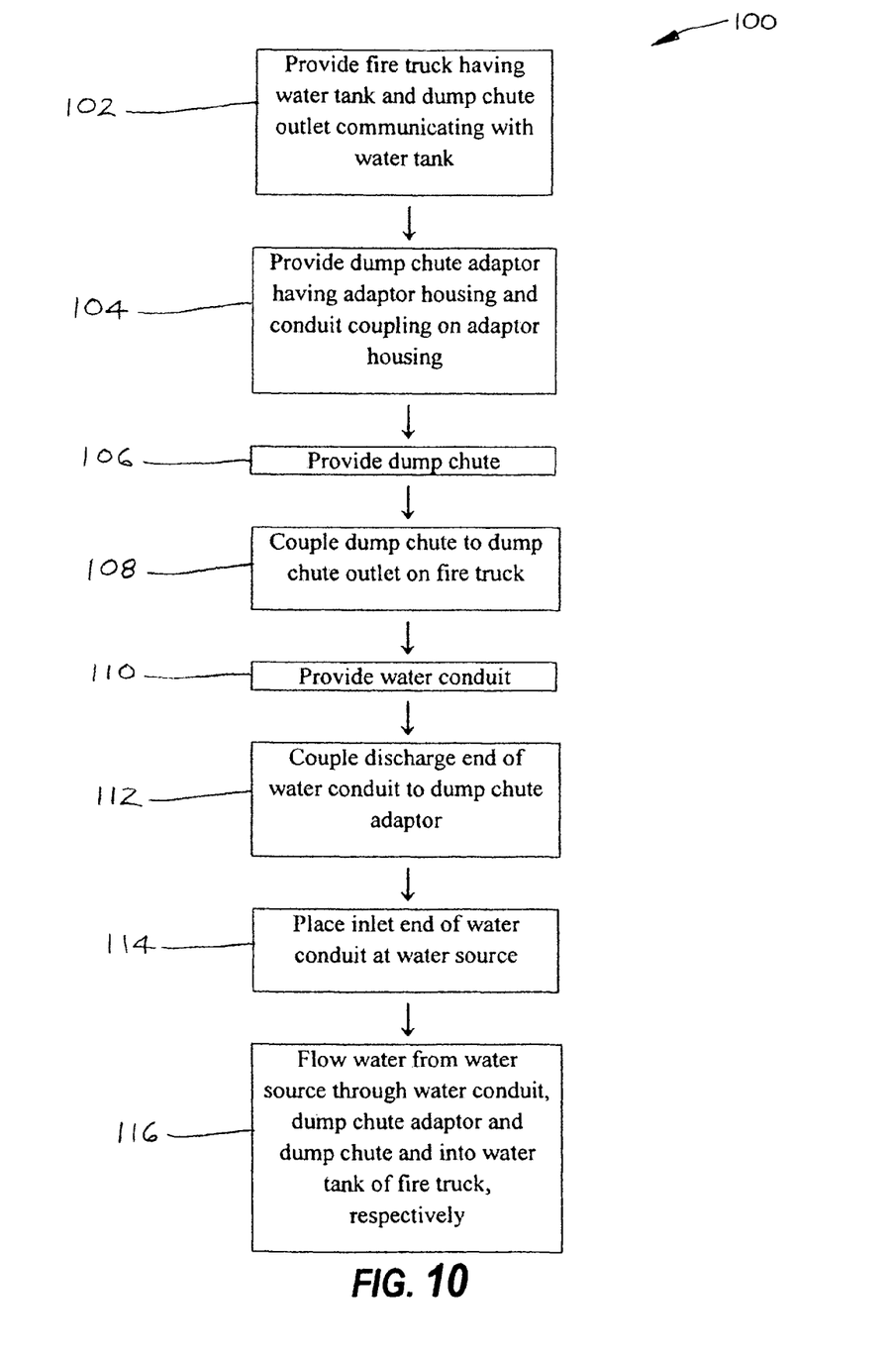
FIG. 10 is a flow diagram of an illustrative embodiment of a method of filling a water tank in a fire truck.

Referring next to FIG. 10 of the drawings, a flow diagram 100 of an illustrative embodiment of a method of filling a water tank in a fire truck is illustrated. In block 102, a fire truck having a water tank and a dump chute outlet communicating with the water tank is provided. In block 104, a dump chute adaptor having an adaptor housing and a conduit coupling provided on the adaptor housing is provided. The conduit coupling may be a standard or conventional Storz coupling. In block 106, a dump chute is provided. In block 108, the dump chute is coupled to the dump chute outlet on the fire truck. In block 110, a water conduit is provided. In block 112, the discharge end of the water conduit is coupled to the dump chute. In block 114, the inlet end of the water conduit is placed at a water source. The water source may be a fire hydrant, a fire truck or a body of water such as a lake, river, pond or swimming pool, for example and without limitation. In block 116, water flows or is pumped from the water source through the water conduit, the dump chute adaptor and the dump chute and into the water tank of the fire truck, respectively.

While the embodiments of the disclosure have been described above, it will be recognized and understood that various modifications can be made and the appended claims are intended to cover all such modifications which may fall within the spirit and scope of the disclosure.

What is claimed is:

1. A dump chute adaptor, comprising:
an adaptor housing having a housing interior;
a conduit coupling carried by the adaptor housing and disposed in fluid communication with the housing interior; and
a coupling plate having a coupling opening carried by the adaptor housing, the conduit coupling disposed in fluid communication with the coupling opening and the coupling plate pivotally carried by the adaptor housing.

2. The dump chute adaptor of claim 1 further comprising at least one coupling plate latch carried by the adaptor housing and adapted to engage the coupling plate.

3. The dump chute adaptor of claim 2 wherein the at least one coupling plate latch comprises a latch base, a latch sheath carried by the latch base, a latch hasp slidably carried by the latch sheath and a spring-loaded coupling handle carried by the latch sheath and engaging the latch hasp.

4. The dump chute adaptor of claim 3 further comprising at least one latch hasp receptacle carried by the coupling plate and a hasp slot provided in the latch hasp receptacle and adapted to receive the latch hasp.

5. The dump chute adaptor of claim 1 further comprising a housing flange provided in the housing interior of the housing.

6. The dump chute adaptor of claim 5 further comprising a chute seal gasket carried by the housing flange.

7. A dump chute adaptor, comprising:
an adaptor housing having a housing interior, a first housing edge and a second housing edge;
a housing flange provided in the housing interior at the first housing edge;
a chute seal gasket carried by the housing flange;
a coupling plate having a coupling opening carried by the adaptor housing at the first housing edge; and
a conduit coupling carried by the coupling plate and including a center coupling conduit disposed in fluid communication with the coupling opening, an inner coupling collar and an outer coupling collar disposed in concentric relationship with respect to the center coupling conduit and a pair of lock flanges and a pair of lock grooves provided in the outer coupling collar.

8. The dump chute adaptor of claim 7 wherein the adaptor housing has a generally rectangular cross-section.

9. The dump chute adaptor of claim 7 wherein the coupling plate is pivotally carried by the adaptor housing.

10. The dump chute adaptor of claim 9 further comprising at lease one coupling plate latch carried by the adaptor housing and adapted to engage the coupling plate.

11. The dump chute adaptor of claim 10 wherein the at least one coupling plate latch comprises a latch base, a latch sheath carried by the latch base, a latch hasp slidably carried by the latch sheath and a spring-loaded coupling handle carried by the latch sheath and engaging the latch hasp.

12. The dump chute adaptor of claim 11 further comprising at least one latch hasp receptacle carried by the coupling plate and a hasp slot provided in the latch hasp receptacle and adapted to receive the latch hasp.

13. The dump chute adaptor of claim 7 further comprising a dump chute having a dump chute end inserted in the housing interior of the adaptor housing and engaging the chute seal gasket.

14. A method of filling a water tank in a fire truck, comprising:
- providing a fire truck having a water tank and a dump chute outlet communicating with the water tank;
- providing a dump chute adaptor having an adaptor housing and a conduit coupling carried by the adaptor housing;
- providing a dump chute;
- coupling the dump chute to the dump chute outlet on the fire truck;
- providing a water conduit;
- coupling the water conduit to the conduit coupling of the dump chute adaptor;
- providing the water conduit in fluid communication with a water source; and
- flowing water from the water source through the water conduit, the dump chute adaptor and the dump chute into the water tank of the fire truck, respectively.

15. The method of claim 14 wherein the providing the water conduit in fluid communication with a water source comprises providing the water conduit in fluid communication with a selected one of a fire hydrant, a fire truck and a body of water.

16. The method of claim 14 wherein the flowing water from the water source through the water conduit, the dump chute adaptor and the dump chute into the water tank of the fire truck, respectively, comprises pumping water from the water source through the water conduit, the dump chute adaptor and the dump chute into the water tank of the fire truck, respectively.

17. The method of claim 14 wherein the providing a dump chute adaptor having an adaptor housing and a conduit coupling carried by the adaptor housing comprises providing a dump chute adaptor having an adaptor housing, a coupling plate pivotally carried by the adaptor housing and a conduit coupling carried by the coupling plate, and further comprising closing the coupling plate on the adaptor housing prior to coupling the water conduit to the conduit coupling of the dump chute adaptor.

18. The method of claim 17 further comprising opening the coupling plate on the adaptor housing and discharging water from the water tank of the fire truck through the dump chute outlet, the dump chute and the dump chute adaptor, respectively.

* * * * *